United States Patent
Diao et al.

(10) Patent No.: US 9,626,640 B2
(45) Date of Patent: Apr. 18, 2017

(54) CLOSED LOOP PERFORMANCE MANAGEMENT FOR SERVICE DELIVERY SYSTEMS

(71) Applicant: International Business Machines Corporation, Armonk, NY (US)

(72) Inventors: Yixin Diao, White Plains, NY (US); Aliza R. Heching, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 13/971,118

(22) Filed: Aug. 20, 2013

(65) Prior Publication Data

US 2014/0019181 A1    Jan. 16, 2014

Related U.S. Application Data

(63) Continuation of application No. 13/460,546, filed on Apr. 30, 2012, now abandoned, which is a continuation of application No. 13/446,738, filed on Apr. 13, 2012, now abandoned.

(51) Int. Cl.
G06Q 10/06 (2012.01)

(52) U.S. Cl.
CPC .............................. *G06Q 10/06316* (2013.01)

(58) Field of Classification Search
USPC ........................................................ 705/7.13
See application file for complete search history.

(56) References Cited

U.S. PATENT DOCUMENTS

| | | |
|---|---|---|
| 2003/0046396 A1 | 3/2003 | Richter |
| 2007/0130231 A1 | 6/2007 | Brown et al. |
| 2009/0235104 A1 | 9/2009 | Fung |
| 2009/0262923 A1 | 10/2009 | Anerousis et al. |
| 2011/0123275 A1 | 5/2011 | Nelson |
| 2012/0130936 A1 | 5/2012 | Brown et al. |

OTHER PUBLICATIONS

Diao et al., "Closed Loop Performance Management for Service Delivery Systems," U.S. Appl. No. 13/446,738, filed Apr. 13, 2012, 48 pages.
Diao et al., "Closed Loop Performance Management for Service Delivery Systems," U.S. Appl. No. 13/460,546, filed Apr. 30, 2012, 48 pages.
Diao et al., "Closed Loop Performance Management for Service Delivery Problems," Proceedings of IEEE/IFIP Network Operations and Management Symposium, Maui, Hawaii, Apr. 16-20, 2012, 9 pages.
Non-final office action dated Aug. 31, 2012 regarding U.S. Appl. No. 13/460,546.

(Continued)

*Primary Examiner* — Thomas L Mansfield, Jr.
(74) *Attorney, Agent, or Firm* — Yee & Associates, P.C.; Louis J. Percello

(57) ABSTRACT

A computer implemented method delivers information technology services according to a set of service level agreements. A service request class having a largest control error is identified from a plurality of service request classes. The service request priority of the service request class having the largest control error is then increased to form an updated priority. Service requests for the plurality of service request classes are dispatched in a next control iteration based upon the updated priority.

9 Claims, 9 Drawing Sheets

(56) References Cited

OTHER PUBLICATIONS

Final office action dated Mar. 25, 2013 regarding U.S. Appl. No. 13/460,546, 10 pages.
Notice of allowance dated Jul. 9, 2013 regarding U.S. Appl. No. 13/460,546, 12 pages.
Non-final office action dated Sep. 4, 2012 regarding U.S. Appl. No. 13/446,738, 20 pages.
Final office action dated Apr. 3, 2013 regarding U.S. Appl. No. 13/446,738, 12 pages.
Notice of allowance dated Jul. 19, 2013 regarding U.S. Appl. No. 13/446,738, 12 pages.

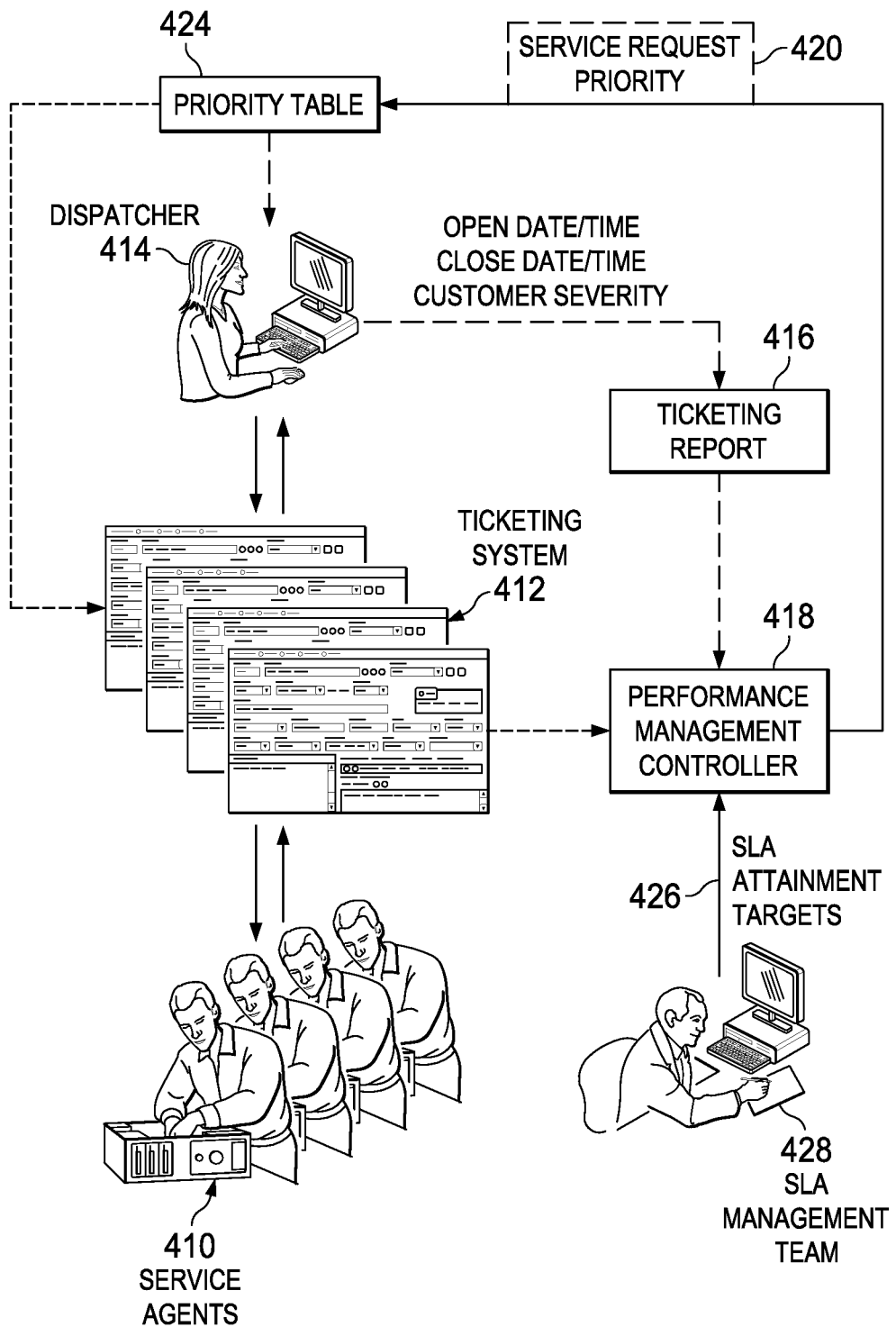

FIG. 7

| AVERAGE WEEKLY VOLUME | CUSTOMER 1 511.2 | CUSTOMER 2 291.3 | CUSTOMER 3 57.6 |
|---|---|---|---|
| SEV 1 PERCENT | 0.2% | 2.3% | 0.5% |
| SEV 2 PERCENT | 5.8% | 1.8% | 2.1% |
| SEV 3 PERCENT | 50.7% | 39.6% | 64.8% |
| SEV 4 PERCENT | 43.3% | 56.3% | 32.6% |

FIG. 8

|  | C1 | C2 | C3 |
|---|---|---|---|
| Sev1 | 95% IN 4C | 99% IN 2C | 95% IN 4C |
| Sev2 | 90% IN 8C | 99% IN 4C | 90% IN 8C |
| Sev3 | 80% IN 12C | 95% IN 8C | 85% IN 24C |
| Sev4 | 80% IN 24C | 90% IN 16C | 85% IN 48C |

FIG. 9

|  | C1 | C2 | C3 |
|---|---|---|---|
| Sev1 | 96% | 78% | 98% |
| Sev2 | 100% | 95% | 100% |
| Sev3 | 100% | 99% | 100% |
| Sev4 | 91% | 74% | 96% |

FIG. 11

|      | C1   | C2   | C3   |
|------|------|------|------|
| Sev1 | 94%  | 86%  | 100% |
| Sev2 | 99%  | 96%  | 98%  |
| Sev3 | 99%  | 98%  | 98%  |
| Sev4 | 84%  | 96%  | 75%  |

CLOSED LOOP PERFORMANCE MANAGEMENT FOR SERVICE DELIVERY SYSTEMS

This application is a continuation of application Ser. No. 13/460,546 filed Apr. 30, 2012, status pending, which is a continuation of application Ser. No. 13/446,738 filed Apr. 13, 2012, status pending.

BACKGROUND

1. Field

The disclosure relates generally to a computer implemented method, a data processing system, and a computer program product for information service technology delivery. More specifically, the disclosure relates generally to a computer implemented method, a data processing system, and a computer program product for providing service technology delivery by considering current service level agreement attainment levels when assigning and prioritizing service requests

2. Description of the Related Art

Information Technology (IT) service delivery is characterized by strict service level agreements (service level agreements), an increasingly competitive environment, and ever narrowing profit margins. Consequently, service providers are continually searching for methods to improve quality of delivery while reducing cost of operations. These conflicting objectives lead providers to identify innovative methods for managing their business. Improved management of service attainment levels is one of the critical areas where providers seek improved performance, since missed service level targets result in both decreased customer satisfaction and significant monetary penalties.

A service request is a request that has associated service level targets as documented in the Service Level Agreements. Similarly, service operation management is the management of daily service operation.

In a service delivery environment, each arriving service requests has an associated contractual service level agreements (service level agreements) that specifies the "quality of service" required for the incoming requests. Typically, service level agreements are structured such that service level agreement misses and penalties are not measured on a request-by-request basis, rather, against the performance of a group of arriving requests over a contractually specified time period. This leads to two distinctive management functions, namely, service operation management for daily request handling and service level management for periodic service level agreement performance calculation and reporting (typically monthly).

However, separation of these two management functions results in reduced coordination across these two systems that impact one another's performance. In service operation management, incoming requests are prioritized and dispatched to service agents based upon the severity or target time of each request, irrespective of the attainment level achieved by the associated service request class in the current evaluation period. In service level management, an service level agreement analyst team monitors and reports on service level agreement attainment levels at the end of each evaluation period which, in the case of service level agreement target miss, is too late to implement corrective actions.

SUMMARY

According to one embodiment of the present invention, a computer implemented method is disclosed for dispatching service request. A service request class having a largest control error is identified from a plurality of service request classes. The service request priority of the service request class having the largest control error is then increased to form an updated priority. Service requests for the plurality of service request classes are then dispatched in a next control iteration based upon the updated priority.

According to one embodiment of the present invention, a computer implemented method for delivering information technology services according to a set of service level agreements is provided. A service request class having a largest control error is identified from a plurality of service request classes. The service request priority of the service request class having the largest control error is then increased to form an updated priority. Service requests for the plurality of service request classes are then dispatched in a next control iteration based upon the updated priority.

According to one embodiment for the present invention, a computer implemented method for prioritizing service requests is provided. A service request class having a largest control error is identified from a plurality of service request classes. The service request priority of the service request class having the largest control error is then increased to form an updated priority. Service requests for the plurality of service request classes are then dispatched in a next control iteration based upon the updated priority.

BRIEF DESCRIPTION OF THE SEVERAL VIEWS OF THE DRAWINGS

FIG. 4 is a service delivery process having an integrated feedback controller according to an illustrative embodiment;

FIG. 7 is a table showing an example of an average weekly volume of service requests per customer as well as a summary of the distribution of service requests across four severity levels for a particular service functional group according to an illustrative embodiment;

FIG. 8 is a table showing service level targets for each service request class for a particular service functional group according to an illustrative embodiment;

FIG. 9 is a table showing an example of reports on the performance of a severity-based dispatching policy that dispatches service requests solely based on request severity for a particular service functional group according to an illustrative embodiment;

FIG. 11 is a table showing reports on the performance of an earliest deadline first dispatching policy that dispatches

DETAILED DESCRIPTION

Figure 1:
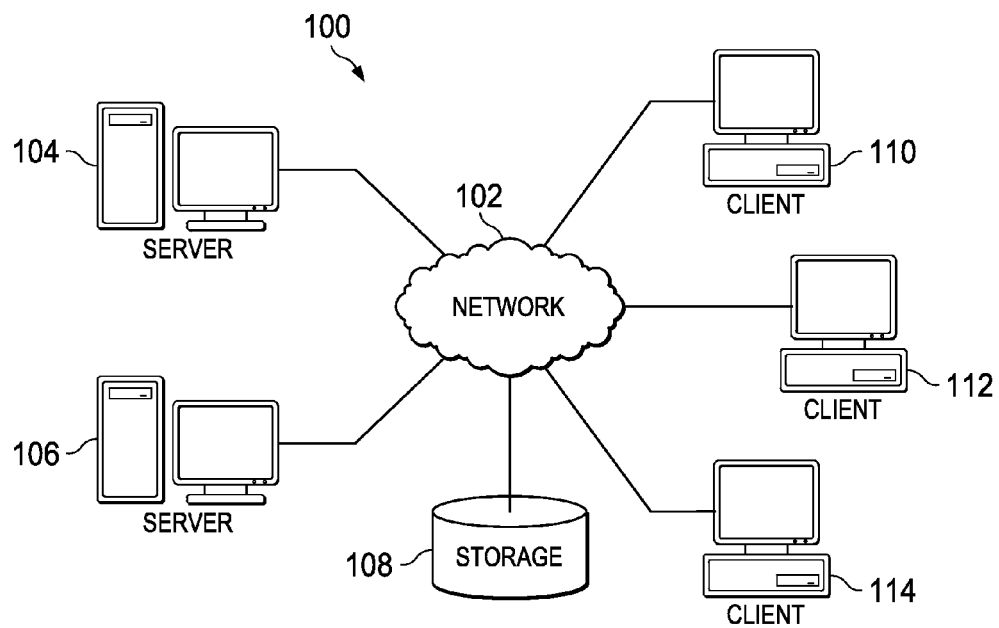
FIG. 1 is a pictorial representation of a network of data processing systems in which illustrative embodiments may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures and, in particular, with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

Figure 2:
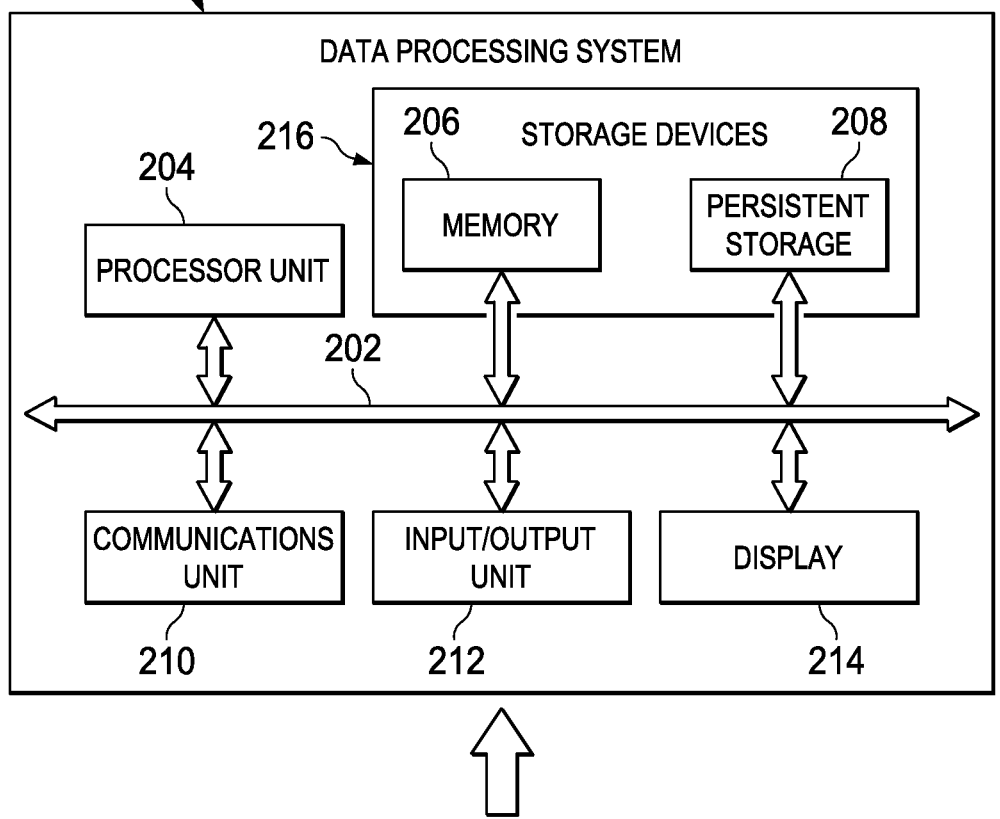
FIG. 2 is an illustration of a data processing system in accordance with an illustrative embodiment.

Turning now to FIG. 2, an illustration of a data processing system is depicted in accordance with an illustrative embodiment. Data processing system 200 may be a server computer such as server computer 104 and server computer 106 of FIG. 1. Data processing system 200 may also be a client computer, such as client computers 110, 112, and 114 of FIG. 1. In this illustrative example, data processing system 200 includes communications framework 202, which provides communications between processor unit 204, memory 206, persistent storage 208, communications unit 210, input/output (I/O) unit 212, and display 214. In these examples, communications frame work 204 may be a bus system.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications framework 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these examples, computer readable storage media 224 is a physical or tangible storage device used to store program code 218 rather than a medium that propagates or transmits program code 218. Computer readable storage media 224 is also referred to as a computer readable tangible storage device or a computer readable physical storage device. In other words, computer readable storage media 224 is a media that can be touched by a person.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 218 may be omitted because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

In another example, a bus system may be used to implement communications framework 202 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 206, or a cache, such as found in an interface and memory controller hub that may be present in communications framework 202.

The illustrative embodiments herein describe a closed loop performance management scheme that integrates service level management and service operation management in order to achieve proactive service level agreement management via dynamic dispatching priority adjustment. Under the integrated system, dispatching decisions are made based on static information including request severity and service level agreement target time as well as dynamic service level agreement attainment levels reflecting the dynamic nature of workload variation and delivery capability changes.

The illustrative embodiments herein describe provide an integrated system that is a "closed loop" scenario where current service level agreement measurements influence future measurements via the dispatching decisions. In this way, the service agents can be optimally utilized to minimize service level agreement violation, as well as costs of any service level agreement violation. Attainment of service level agreement targets from all service request classes can be best met. The illustrative embodiments herein describe a feedback-based solution that dynamically adjusts request dispatching priorities based on the difference between the service level agreement attainment target and up to date attainment level measurement.

Figure 3:
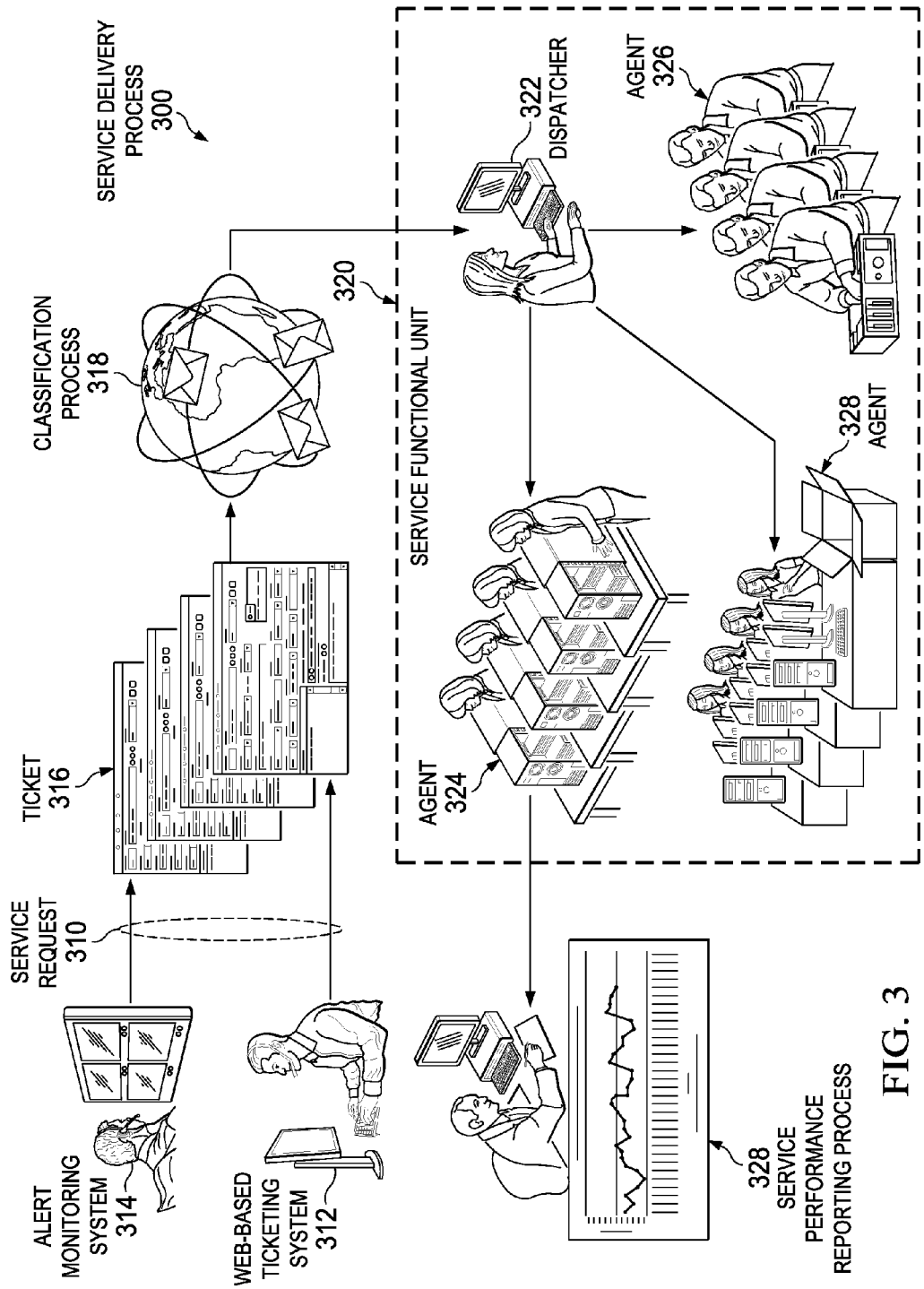
FIG. 3 is a service request life cycle for a service delivery process illustrating the role of service operation management and service level management according to an illustrative embodiment.

Referring now to FIG. 3, a service request life cycle for a service delivery process illustrating the role of service operation management and service level management is described according to an illustrative embodiment.

Service request 310 is a request that has a set of associated service level targets as documented within a Service Level Agreement. Service request 310 includes, but is not limited to, service interruption incidents, such as but not limited to a database failure, as well as standard user requests, such as but not limited to a password reset request. 1Note that IT Information Library (ITIL) distinguishes between incidents Service request 310 is typically introduced into service delivery process 300 via Web-based ticketing system 312 or alert monitoring system 314. Following a service interruption, an end-user reports an issue via web-based ticketing system 312. Help desk personnel who cannot resolve the end-user's reported issue create service request 310 for second level support. Alternatively, alert monitoring system 314 monitors customer systems to proactively identify a problem or system failure. Alert monitoring system 314 then automatically creates service request 310. Subsequently, service delivery process 300 creates ticket 316 to document the details of service request 310. Ticket 316 is a formal description of the service request 310 containing such details such as, for example, but not limited to, customer name, creation date and time, request severity, and problem description.

Service delivery process 300 then performs classification process 318 for assigning service request 310 to service functional unit 318. In order to ensure that service request 310 receive appropriate services, classification process 318 classifies service request 310 into service classes based on a fixed mapping that considers technology area and customer assignment. After service request 310 is classified, service delivery process routes service request to service functional unit 320. Service functional unit 320 is one of a set of service functional units. Each of the set of service functional unit is a group of service agents with common skills who are capable of responding to similar service requests, such as service request 310.

Upon arrival to the service functional unit, service requests are reviewed by dispatcher 322. Dispatcher 322 prioritizes service requests, such as service request 310, and assigns those service requests to one of a set of service agents 324, 326, and 328. Dispatcher can assign service request 30 based on factors such as but not limited to, request severity, agent skill, and agent availability.

Dispatcher 322 in service operation management ensures proper service request handling. Typically, a request priority for service requests, such as service request 310, is determined based on the request severity specified at the request creation time. The request priority reflects the urgency of the service request. The request priority is associated with different contractual service level agreements regarding target resolution time and target attainment levels for the service requests. For a given customer, a higher severity service request will typically have a shorter target time and higher target attainment. However, for the same severity level, target resolution times and target attainment levels may vary across customers.

Agents 324, 326, and 328 typically respond to service requests, such as service request 310, in order of request priority. Agents 324, 326, and 328 may "multitask" by managing multiple requests simultaneously. Multitasking can include, but is not limited to batch processing similar requests, placing requests on-hold while waiting for additional customer input, or preempting requests in service due to the arrival of higher priority requests.

Service delivery process 300 then performs service performance reporting process 318. Service performance reporting 318 provides critical feedback in future management of Service delivery process 300, and is conducted at various levels. For example, service performance reporting 318 may provide request resolution time and backlog level that are typically reported at the service functional unit level as health management. Successful service delivery management, as measured by various optimal system performance metrics including meeting service level attainment targets, requires close integration between service operation management and service level management.

Despite improvements in dispatching, current dispatching practice sets priority based upon request severity level or target completion date, rather than service class attainment level. There are several operational challenges contributing to this practice.

First, the role of dispatching falls under service operation while the role of service level management falls under service design. Coordination is challenging since dispatching and service level attainments are classified into different functional areas and are managed by different organizations.

Second, there is a misconception that prioritizing requests according to severity or target completion date will minimize service level agreement misses and lead to meeting the service level agreement attainment targets.

Third, the dispatcher typically lacks visibility into the up to date attainment information since attainment is usually managed by a customer support team. Moreover, even if the dispatcher is able to access this information, it is typically only updated at the end of the evaluation cycle and thus is not available in real time.

Fourth, customers are often serviced by multiple service functional units (due to skills requirements) and thus service level agreement attainment information must be collected from multiple service functional units for joint service level management. Such coordination renders challenges for real-time dispatching decision making.

Finally, given the dynamic nature of workload arrivals, prioritization of requests based upon attainment level has been questioned. A static prioritization scheme cannot respond to workload variation. Dynamically changing request prioritization must include rules for how much to vary the priority and has raised concerns regarding whether it will cause performance oscillation.

The illustrative embodiments described herein recognize that improvements in service level agreement attainment can be realized by considering current service level agreement attainment levels when assigning and prioritizing service requests by a dispatcher within a service delivery process, such as service delivery process 300. The illustrative embodiments described herein describe a feedback control framework that determines request priority with a goal of meeting a service attainment fairness objective across all service request classes, defined by the combination of customers severity levels. Use of the closed loop system guided by feedback control principles provides a framework for a stable controller and can lead to robust performance against workload variation.

Rather than accessing attainment information from the service level management team, the feedback control framework of the illustrative embodiments integrates with the ticketing system used by the service agents for opening and closing service requests. Feedback controllers operate in a distributed manner with each service functional unit having its own set of controllers. Global service level agreement targets are used as the local targets, such that meeting the local targets leads to meeting the global targets.

Referring now to FIG. 4, a service delivery process having an integrated feedback controller is shown according to an illustrative embodiment. Service delivery Service agents 410 are service agents such as service agents 324, 326, and 328 of FIG. 3. Service agents 410 interact with ticketing system 412 in order fulfill service requests, such as service request 310 of FIG. 3.

In one illustrative embodiment, ticketing system 412 includes a management interface. Service agents 410 can then utilize a real-time adapter to directly extract service request information about the service request from ticketing system 412. The service request information can include for example but not limited to, a request open date and a request open time for the service request, a request close date and a request close time for the service request, a customer, and a severity level for the service request.

In another illustrative embodiment, ticketing system 412 is hosted in a customer environment which forbids programmable connection. The forbidding of a programmable connection may for example, be due to security concerns. Dispatcher 414 can create ticketing report 416 and fetch the service request information from ticketing system 412.

Performance management controller 418 is a software component that determines service request priority 420 with the goal of meeting a service attainment fairness objective across all service request classes. service request classes are defined by the combination of customers severity levels. Performance management controller 418 is a closed loop system guided by feedback control principles. Performance management controller 418 can adjust the service request priority 420 within priority table 424. Ticketing system 410 can then prioritize the service requests according to service request priority 420. In this manner, performance management controller 418 provides a framework for a stable controller and provides robust performance against workload variation.

In one illustrative embodiment, performance management controller 418 operates to set service request priority 420 of service requests on a daily basis. In this embodiment, the response time from dispatcher 414 manually creating ticketing report 416 is acceptable.

Another data source for Performance management controller 418 is the service level agreement attainment target information 426 from service level management team 428. Service level management team 428 is a team responsible for reporting the SLAs. The service level agreement attainment target information 426 can include but is not limited to the following format, "x % of severity y tickets must be resolved within z hours."

Performance management controller 418 enters service request priority 420 for each service request class is then provided to the system for prioritization of service requests. In one illustrative embodiment wherein a management interface is provided, service request priority 420 can be directly entered to the ticketing system 410 to mark the priority of the service requests in the next control interval. In one illustrative embodiment, service request priority 420 can be summarized in priority table 422. Priority table 422 is then provided to dispatcher 414 for manual prioritization.

Figure 5:
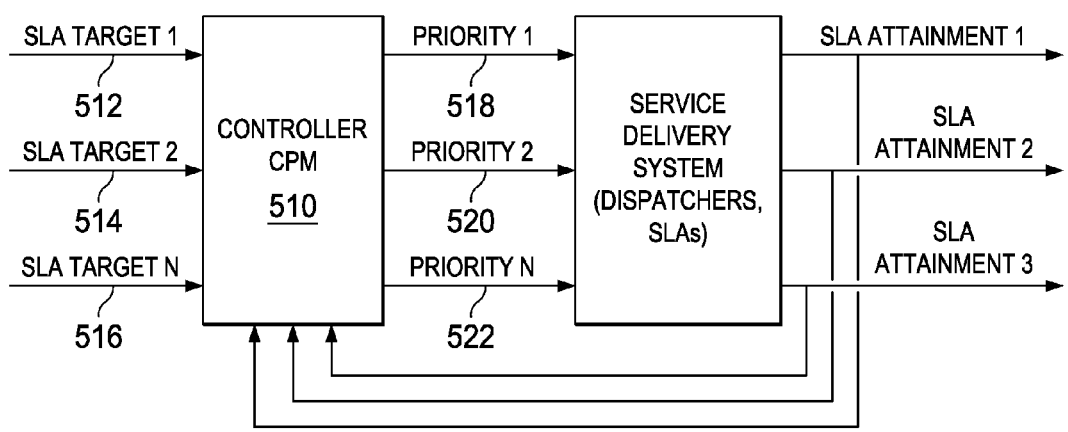
FIG. 5 is an operational dataflow for a closed loop performance management according to an illustrative embodiment.

Referring now to FIG. 5, an operational dataflow for a closed loop performance management is shown according to an illustrative embodiment. Feedback control system 500 includes controller 510, which is Performance management controller 418 of FIG. 4.

Contractual service level agreements can take various forms. The most common contractual service level agreements, namely service level agreements miss and associated penalties, are measured against an attainment percentage target over a predefined evaluation period rather than on a request-by-request basis. Service level agreements targets 512-516 reflects the multiple contractual service level agreements against which delivery performance is measured for the combination of customers, types of service requests, and severities. The types of service requests can be, for example but not limited to, alerts, incidents, and change requests.

The objective for Feedback control system 500 is to meet service level agreement targets 512-516 for all service level agreement classes. Meeting service level agreement targets 512-516 is different from prioritizing outstanding service requests strictly according to request severities without considering contractual requirements on the attainment percentage. In feedback control system 500, the existence of modeling and estimation errors lead to steady state errors. Therefore workload information, such as arrival rate or service time is not directly used to make control decisions. However, feedback control system 500 can incorporate workload information to compose a feedback/feed forward control system.

Increasing priority for one class of requests impacts the service level agreement attainment level for all service request classes. This results in a complicated multi-input multi-output (MIMO) system and introduces challenges for both system modeling and controller design. Feedback control system 500 converts this MIMO control problem into multiple single-input single-output (SISO) control problems to simplify solution design for closed loop performance management. Specifically, feedback control system 500 considers a control objective of equal safety margin across all service level agreement classes, to ensure that for any service level agreement class i and j:

$$r_i - y_i(k) = r_j - y_j(k)$$

wherein:

$I=\{i|1, 2, \ldots, N\}$ denotes an $i^{th}$ set of service level agreements managed;

$r_i$ denotes the service attainment target associated with service level agreement contract i;

$y_i(k)$ denote the service attainment measurement for the $i^{th}$ service level agreement, measured at time k;

$I=\{i|1, 2, \ldots, N\}$ denotes an $j^{th}$ set of service level agreements managed;

$r_j$ denotes the service attainment target associated with service level agreement contract j; and $y_j(k)$ denote the service attainment measurement for the $j^{th}$ service level agreement, measured at time k.

Such a control objective ensures fair service across all classes so that the service level agreement attainment targets can be met for all service classes and proper safety margins are set in all service classes. This enables unexpected disturbance in request volumes to be managed.

The above control objective assumes that all service level agreements can be met given the combination of service request volume, service agent composition, and service level agreement attainment targets. If this "feasibility assumption" cannot be met, the fairness objective will lead to failure of all service level agreements, which is undesirable. The feasibility assumption will generally hold if the service functional unit is correctly staffed.

Not all service level agreement classes must necessarily be included under the controller for re-prioritization. For example, due to the high business impact of high severity classes and their relatively low volume as compared with other requests, requests for high severity classes should always be assigned by the dispatcher irrespective of controller evaluation.

Typically, different service level agreement contracts carry different monetary penalties for service level agreement violation. Therefore, in one illustrative embodiment, a weighted control objective would allow controller 510 to prioritize service requests based upon a combination of service level agreement attainment and monetary penalty. The weighted control objective is given by:

$$w_i(r_i - y_i(k)) = w_j(r_j - y_j(k))$$

Wherein:

$w_i$ denotes the weighting factor for the $i^{th}$ service level agreement; and $w_j$ denotes the weighting factor for the $j^{th}$ service level agreement.

A larger penalty cost leads to a larger safety margin or a smaller wi value. For example, if the service level agreement penalty for class i is $200,000 and the service level agreement penalty for class j is $100,000, one illustrative embodiment can set wi=1 and wj=2. The weighting factors therefore set desired safety margin for class i twice as large as that for class j.

For ease of control design, instead of comparing the safety margin between multiple service classes, one illustrative embodiment determines the control objective according to an equivalent form of:

$$w_i(r_i - y_i(k)) = \frac{1}{N}\sum_{j=1}^{N} w_j(r_j - y_j(k))$$

Wherein:

$$\frac{1}{N}\sum_{j=1}^{N} w_j(r_j - y_j(k))$$

is calculated as the average safety margin.

Since contractual service level agreement is defined against the evaluation period, $y_i(k)$ reflects the attainment value accumulated since the start of a current evaluation period, for example, at time k=0. However, $y_i(k)$ does not reflects the individual measurement interval, for example [k−1,k].

One illustrative embodiment can achieve the above control objective by using a simple feedback controller, such as an Integral controller. Consider an integral controller where:

$$u_i(k+1) = u_i(k) + K_i e_i(k); \text{ and}$$

$$e_i(k) = w_i(r_i - y_i(k)) - \frac{1}{N}\sum_{j=1}^{N} w_j(r_j - y_j(k))$$

Wherein:
$u_i(k)$ denote the priority of requests in the $i^{th}$ service level agreement class at time k;
$K_i$ defines the control gain; and
$e_i(k)$ denotes control error.
A lower value for $u_i(k)$ indicates higher priority.) The priority of a request is specified by the provider and reflects the order for servicing the request. In contrast to priority, the severity of a request is specified by the customer and reflects the business impact associated with the request.

A provider may increase the priority of a service request class if this class is not performing well relative to its attainment target and relative to other service request classes. In addition, the same severity level requests from different customers may be given different priority if their targets differ.

A first-order linear system model for increasing the priority of a service request class can then be defined as follows:

$$y_i(k+1) = b_i u_i(k)$$

wherein:
$b_i$ is a parameter defining the responsiveness of the system
Control gain can then be determined by the following:

$$K_i = \frac{1-p}{b_i}$$

Wherein:
p denotes the desired closed loop pole, in the range between 0 and 1, which indicates the aggressiveness of the controller
A smaller desired closed loop pole p therefore implies a faster system response. The smaller desired closed loop pole p therefore leads to a more aggressive controller.

Based on service level agreement targets 512-516, in one illustrative embodiment, controller 510 determines priorities 518-522 according to the equations described above. Priorities 518-522 are priorities 422 of FIG. 4. The integral control approach of the illustrative embodiment is simple in design and is sufficient to guide controller operation and lead to acceptable control performance, even considering the intercorrelated nature of priorities 518-522.

Figure 6:
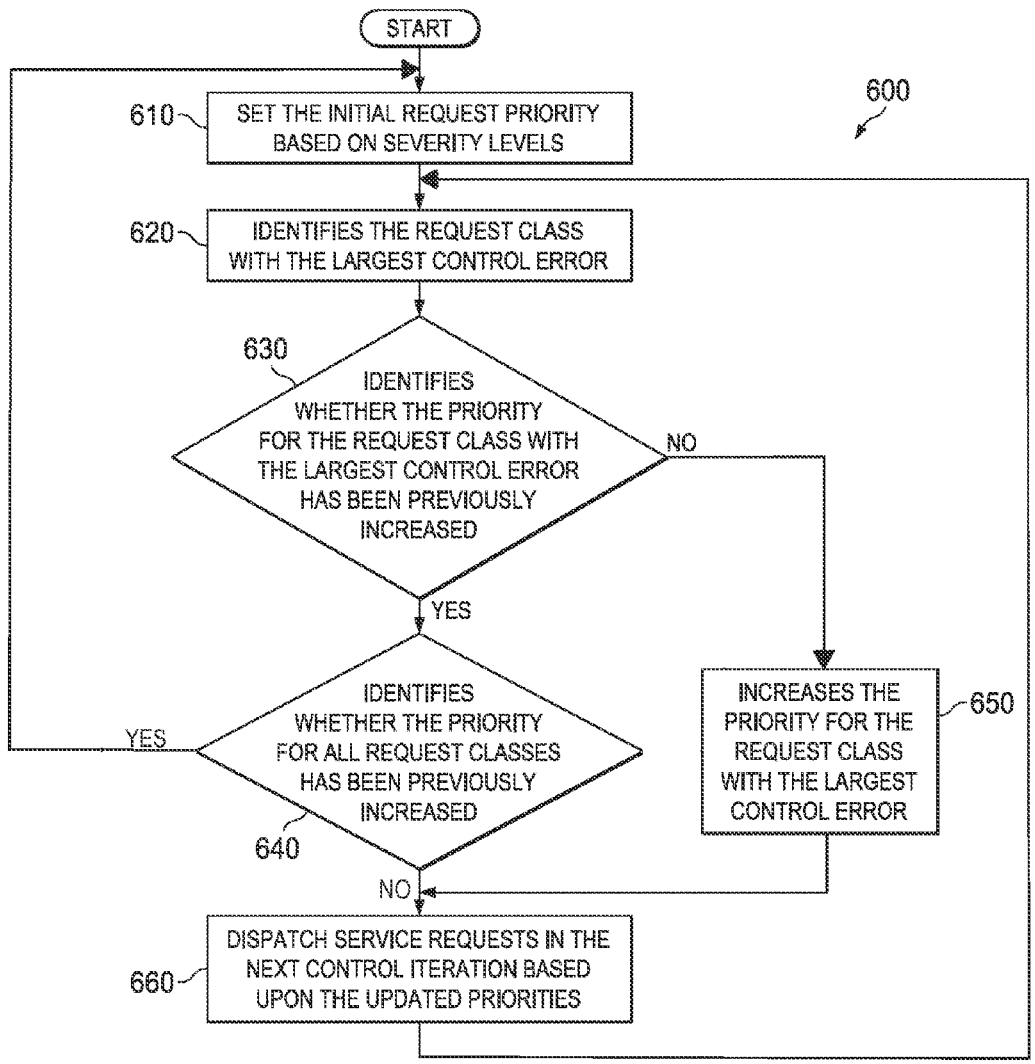
FIG. 6 is a flowchart of a "model free" process for determining control gain is shown according to an illustrative embodiment.

Referring now to FIG. 6, a flowchart of a "model free" process for determining control gain is shown according to an illustrative embodiment. Process 600 describes a greedy approach to determining the control gain. In addition to reducing the modeling complexity, the greedy algorithm of process 600 reduces potential priorities to a small set of priority levels to explore, limiting the controller to a well-defined decision space.

Process 600 begins by setting the initial request priority based on severity levels (step 610). The priority of a request is specified by the provider and reflects the order for servicing the request. In contrast to priority, the severity of a request is specified by the customer and reflects the business impact associated with the request. In one illustrative embodiment, priorities can be an incremental ranking of integers from 1 to 4, with higher priority requests having lower rankings In the illustrative example, process 600 can initially set severity class 4 service requests to priority 4.

In each control iteration, Process 600 identifies the service request class with the largest control error (step 620). In one illustrative embodiment, control error can be determined according to:

$$e_i(k) = w_i(r_i - y_i(k)) - \frac{1}{N}\sum_{j=1}^{N} w_j(r_j - y_j(k))$$

In one illustrative embodiment, in the case where only one service request class cannot meet its service level agreement target, $(r_j - y_j(k))$ will be positive and the control error ei(k) will be positive as well. This service request class will have the largest control error. In the case where all service request classes can meet their service level agreement targets, the service request class closest to its target will show the largest control error.

Process 600 then identifies whether the priority for the service request class with the largest control error has been previously increased (step 630). To ensure smooth reprioritization and dispatching and an effective priority adjustment scheme, process 600 imposes a limit on prioritization increases for each service request class. Since priority increase is an effective way to improve service attainment level, process 600 limit priority increase to only once for each service request class. That is, for example, a priority 4 can be increased to priority 3 but not to priority 2.

Responsive to identifying that the priority for the service request class with the largest control error has been previously increased ("yes" at step 630), process 600 then identifies whether the priority for all service request classes has been previously increased (step 640). Priority increase operates on a relative basis. Once each service request class has been increased once, process resets the priority for all service request classes. Therefore, responsive to determining that the priority for all service request classes has been previously increased ("yes" at step 640), process 600 iterates back to step 610 and reset the request priority for all classes based on severity levels. By limiting increases, process 600 can maintain a simple re-prioritization scheme with a small number of priority levels and reset rules.

Returning now to step 640, responsive to determining that the priority for all service request classes has not been previously increased ("no" at step 640), process 600 does not increase the priority of the service request class with the largest control error. Instead, process 600 proceeds to step 660.

Returning now to step 630, responsive to identifying that the priority for the service request class with the largest control error has not been previously increased ("no" at step 630), process 600 increases the priority for the service request class with the largest control error (step 650).

Process 600 then dispatch service requests in the next control iteration based upon the updated priorities (step 660). In one illustrative embodiment, process 600 reprioritizes priorities for the service request classes on a per control interval basis, rather than a per ticket basis. This reprioritization ensures that enough samples have been collected to make statistically meaningful reprioritization determinations. In addition, since the service level agreement contractual evaluation period is typically monthly, selection for control intervals would be on the order of multiple hours to multiple days, depending on the volume of incoming requests. A too small control interval will introduce unnecessary oscillation, with too few samples to compute the service level agreement attainment. A too large control interval will reduce the control accuracy as the controller will not be able to respond quickly.

Responsive to increases the priority for the service request class with the largest control error, process 600 then returns to step 620 in an iterative fashion.

Referring now to FIG. 7, a table showing an example of an average weekly volume of service requests per customer as well as a summary of the distribution of service requests across four severity levels is shown for a particular service functional group according to an illustrative embodiment. Table 700 is an example of a service level agreement to which the service provider should adhere.

In one illustrative embodiment, a time-varying Poisson process describes the varying arrivals of service requests for each hour of the week. Service time is modeled using a lognormal distribution. The average service time per service request across all service request classes is 79.5 minutes and the standard deviation is 46.4 minutes. The use of Poisson arrivals and lognormal service time distribution are approximated from data collected from the service functional unit and validated for goodness-of-fit using the Kolmogorov-Smirnov test. Because the arrival data and service time are captured by different systems and cannot be combined at the request level due to the use of different identifiers, the present illustrative embodiment is not able to use the production trace b Referring now to FIG. 8, a table showing service level targets for each service request class is shown for a particular service functional group according to an illustrative embodiment. Table 800 is an example of a service level agreement to which the service provider should adhere.

By way of example, 95% of all severity 3 requests for customer 2 must be resolved within 8 calendar hours. Service level agreement attainment is evaluated on a monthly basis. The service functional unit provides 24 by 5 weekday customer support; no requests arrive during the weekends. Service level agreement requirements to resolve service requests are measured based on calendar hours. There are 29 agents in this service functional unit. The agents are organized in five shifts. Each shift works a nine-hour schedule.

Referring now to FIG. 9, a table showing an example of reports on the performance of a severity-based dispatching policy that dispatches service requests solely based on request severity is shown for a particular service functional group according to an illustrative embodiment.

The control framework for the severity-based dispatching policy that dispatches service requests solely based on request severity is referred to as an open loop performance management solutions. Dispatching decisions are based on static input and do not consider dynamic performance relative to service level agreement attainment targets. The severity-based policy dispatches service requests solely based on request severity.

Under severity based dispatching of the illustrative example, all severity 3 service requests are met (and some targets are overachieved) but customer 2 does not meet its targets for severity 4 requests. This miss of severity 4 requests is largely because severity 4 requests have lowest priority under this static dispatching scheme. Thus, any performance deterioration appears first in this lowest request category. Further, due to the difference in target time and target attainment levels, customers may not achieve equal attainment. For example, while all severity 4 tickets are treated equally, severity 4 tickets from customer 2 have a shorter target time and higher attainment target compared to the other customers and thus only much lower attainment as compared with customers 1 and 3. In one illustrative example, evaluation is focused on performance of severity 3 and severity 4 requests rather than severities 1 and 2. This is because there are few severity 1 and 2 requests so greater benefit is achieved by focusing on the high volume service request classes.

Figure 10:
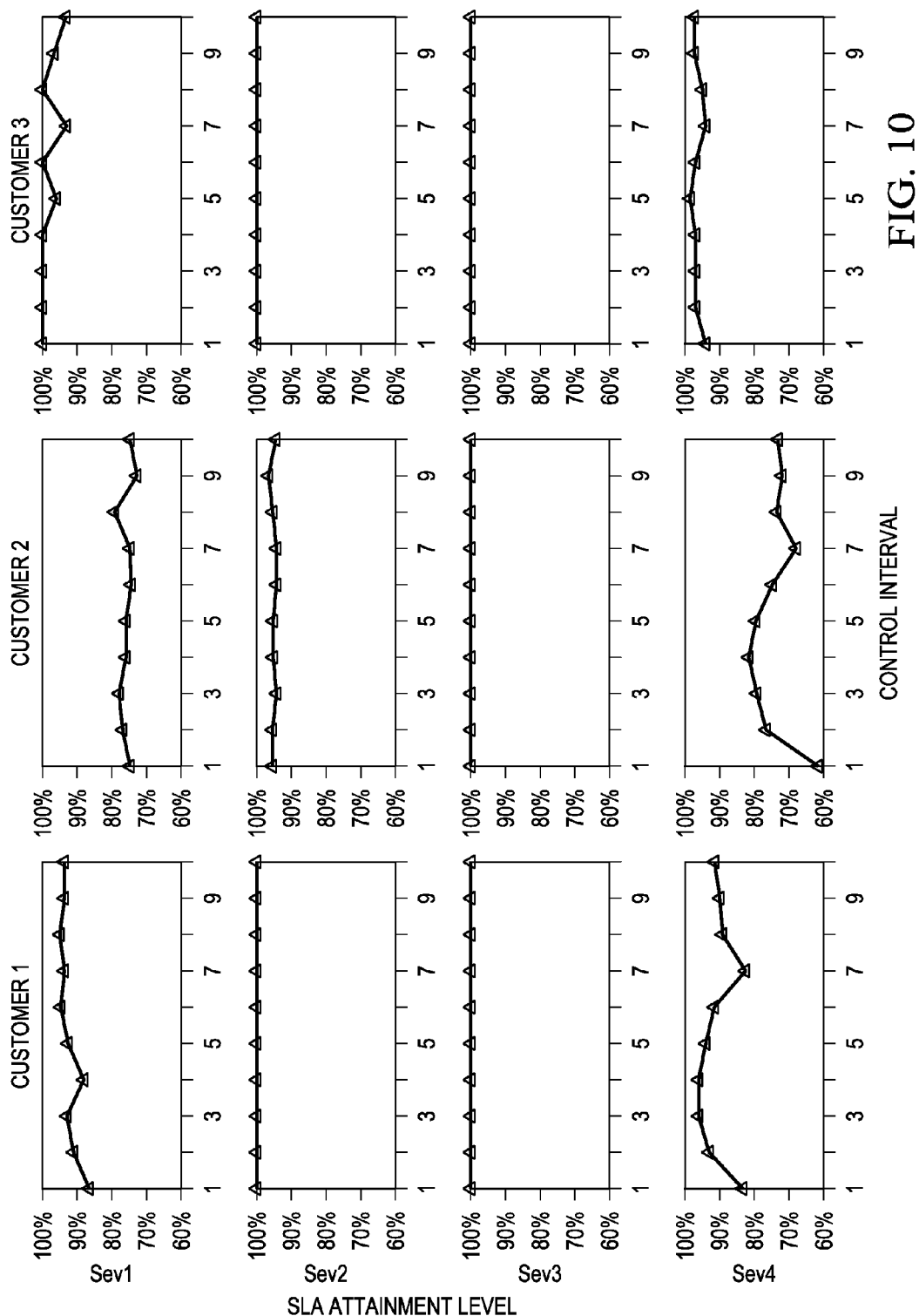
FIG. 10 is a table showing daily variation of service attainment levels under severity based dispatching according to an illustrative embodiment.

Referring now to FIG. 10, is a table showing daily variation of service attainment levels under severity based dispatching according to an illustrative embodiment. Severity 4 shows large variation since it has lowest priority. In one illustrative embodiment. a control interval of one day is selected. The variation is relatively smooth with the exception of severity 4. This is generally expected given severity 4 has lowest priority.

Referring now to FIG. 11 a table showing reports on the performance of an earliest deadline first dispatching policy that dispatches service requests solely based on deadline chronology is shown for a particular service functional group according to an illustrative embodiment.

In the illustrative embodiment of FIG. 11, service level agreements for severity 4 requests from customer 2 can be met because of its shorter target time. However, the service level agreements for severity 4 requests from customer 3 are not met since its target time is the longest as compared with the other customers.

Figure 12:
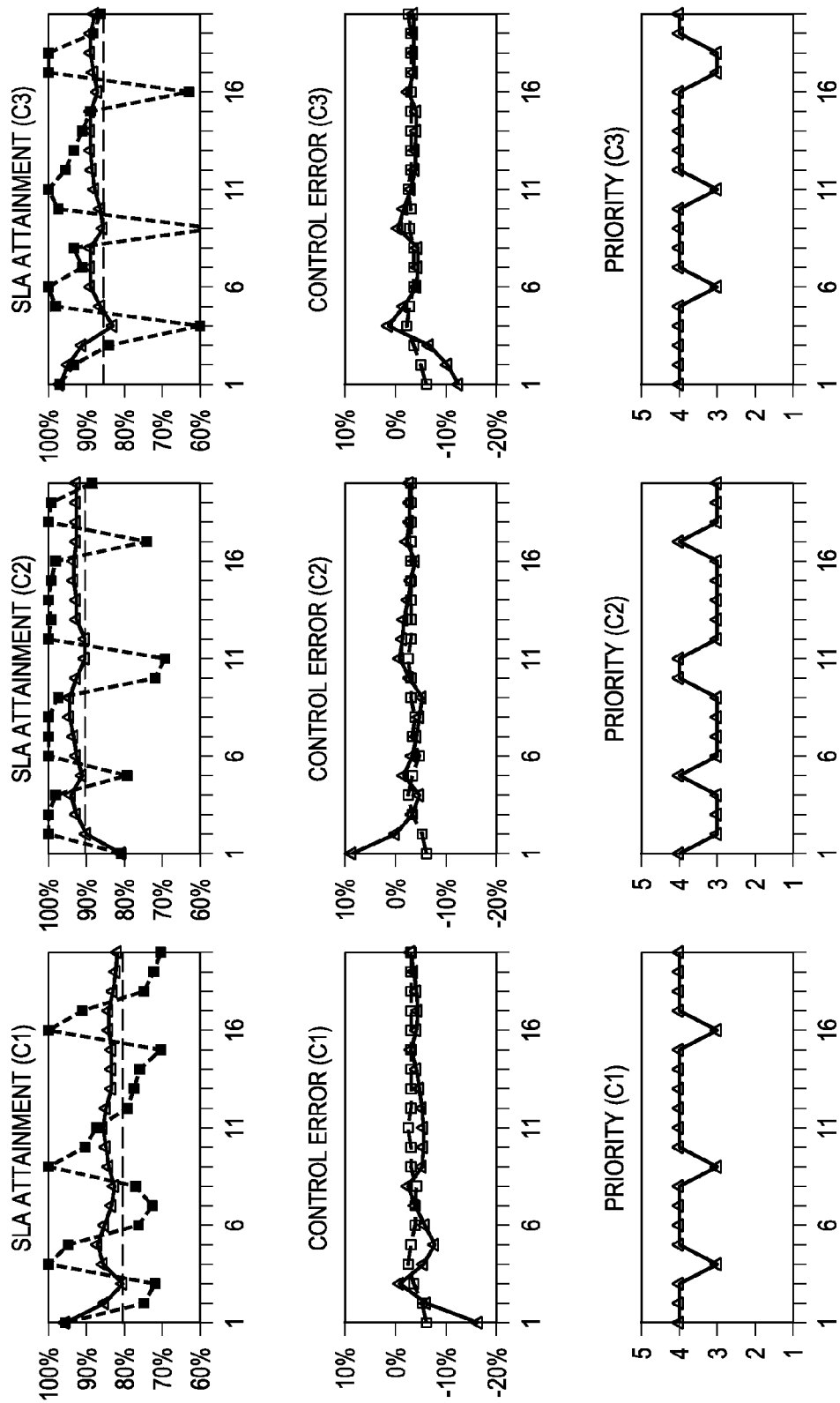
FIG. 12 is various graphs showing metrics for the three customers supported by the service functional unit for a control path of the closed-loop performance management controller according to an illustrative embodiment.

Referring now to FIG. 12, a control path of the closed-loop performance management controller is shown according to an illustrative embodiment.

The controller controls severity 4 attainment levels for the three customers. All weighting factors $w_i$ are set to 1 so that the effect of equal safety margins can easily be observed. Closed loop performance management compares the service attainment level against the target attainment and adjusting dispatching priorities accordingly. The control decision is made in each control interval with the objective of "fairly" meeting the service level attainment targets across all service request classes.

The three sub-figures in the top row of FIG. 12 display the service level agreement attainment metrics for the three customers supported by the service functional unit. The x-axis indicates the control interval and the y-axis indicates the attainment values. The horizontal dashed line indicates the service level agreement attainment targets(ri)) which are 80% for customer 1, 90% for customer 2, and 85% for customer 3 (for severity 4 requests). The lightly colored dotted line (with the greatest variation) indicates the service attainment level measured at the current control interval; the variation comes from resetting priority levels. The darkest solid line (with least variation) indicates the cumulative service attainment level achieved since the beginning of the control run (yi(k))); this metric is used as the feedback signal to guide re-prioritization at the end of each control interval is also used to evaluate and compare with the service level agreement attainment target at the end of the service level agreement evaluation cycle.

The sub-figures in the middle row display the control errors for the three customers. The solid line indicates the difference between the service level target and measurement ($r_i-y_i(k)$) for each customer. The dashed line indicates the average of these differences across all customers $$\frac{1}{N}\sum_{j=1}^{N} w_j(r_j - y_j(k)).$$

The three sub-figures in the bottom row display the priority setting (ui(k)) for the three customers, which are the control input signals changed by the feedback controllers.

As described previously in reference to FIG. 6, the controller operates by setting the priority equal to the severity, that is, priority 4. At the first iteration, accumulated service attainment level equals measured service attainment level: 96%, 81%, and 97% for the three customers, respectively. In FIG. 12, Customer 2 has the lowest attainment level since its target resolution time is the most stringent. As shown in the sub-figures in the middle row, the difference between the service level target and measurement is calculated as −16%, 9%, and −12%. A positive difference means the service level agreement is not met; a negative difference means the service level agreement is met. To compute the control error, the average difference is first calculated as −6% and then the control errors are −10%, 15%, and −6%. Since customer 2 has the largest control error, the greedy controller increases its priority from 4 to 3 for the next control interval.

In the second control iteration, the priority increase improves attainment for customer 2 at the expense of lowered attainment for the remaining customers. The measured service attainment levels are 75%, 99%, and 93%, respectively, and the cumulative service level attainment values are 86%, 90%, and 95%. Similar to control interval 1, the control errors are 0%, 5%, and −5%. Since customer 2 still has the largest control error, the greedy controller retains its priority at 3 for the next control interval.

The controller continues by measuring the attainment levels and adjusting priority levels. When the priority levels from all classes have been increased once, the priority for all classes are "reset". At iteration 4 in this illustrative example, the priority level is [3, 3, 4] and customer 3 has the largest control error. Instead of increasing the priority level to [3, 3, 3], the priority is reset to [4, 4, 4] which has the same effect as [3, 3, 3] but leaves room for priority increase in future control iterations.

The attainment level converges after approximately 10 iterations. The final attainment levels at the end of the month are shown in Table 1200. All service level agreements are met with the exception of priorities 1 and 2 from customer 2, where service level agreements cannot be met due to the short target times relative to the handling time for those service request classes.

Overall, the proposed closed loop performance management solution successfully achieves and balances service level attainments across multiple service level agreement classes.

The control mechanism is simple to implement, robust to request arrival variations, and shows apparent advantages compared to open loop dispatching schemes such as severity-based or earliest deadline first. The demonstrated advantages result from several key design considerations. First, the use of feedback control principles suggest the construction of the closed feedback loop and the selection of service level agreement attainment level as the feedback metrics. This provides a simple yet effective management framework and the required service level attainment information is also easy to monitor. Second, the formulation of the control objective and single-input single-output controllers as well as the use of the greedy algorithm ensures simple control design and eliminates the need for complicated modeling. Further, the greedy solution approach supports easy implementation as there are no significant (historical) data requirements; the controller is initialized with available data and continues to incorporate additional data via the feedback mechanism, as data becomes available. Finally, the overall feedback mechanism is simple to understand, lending itself to easier adoption by delivery management teams and dispatchers.

Numerical experiments of FIG. 12 indicate that the controller can quickly converge to steady state with balanced service attainment levels. Due to this feedback mechanism and continual data updates, the controller quickly responds to changes in workload such as changes in volumes of customer service requests, changes in the distribution across severity levels, or changes in the required service time for different service requests. As such, workload change detection and handling become a natural ingredient of the feedback mechanism, which adds robustness to the controller and is desired for ease of adoption.

The numerical experiment described above considered a scenario where requests from multiple customers were included but all requests were of the same severity (severity 4). The desire to balance and meet service level agreement requirements from multiple customers and to focus on the lower severity classes where dispatching and prioritization matters most is common, since service level agreement violation in high severity service request classes is often due to technical failure rather than incorrect dispatching prioritization.

The proposed approach easily applies to scenarios with multiple severity levels. In this case the controller will modify the request priority across the severity levels according to the attainment-to-date. Similar to the same severity level scenario described above, in the multiple severity level scenario a severity 4 class request can be set with priority 2, 3, or 4, and a severity 3 class request can be set with priority 2 or 3.

Reprioritization may lead to situations where severity 4 requests may be given higher priority than severity 3 requests (for the same customer). Such treatment is designed and optimal from a service level agreement attainment perspective, which is aligned with the contractual agreements that reflect the customer's desire to have differentiated and quantifiable service objectives and the provider's objective to meet the agreement and avoid service level agreement penalties. However, the specification of request severities are driven by business impact. One may question whether it is the customer's intention to prioritize severity 3 requests over severity 4 requests for the sake of meeting service level agreement targets. If not, this conflict can be addressed by modifying the control objective through the use of weighting factors, while the fundamental relationship (and potential conflict) between the contractual service level agreement terms and the business impact may need to be addressed in contract renegotiation.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for programmatic adjustment of a priority of a service request in a workload, the computer implemented method comprising:

initializing a priority of each service request class in a plurality of service request classes, by a performance management controller of a computer in a feedback control system using closed loop performance management that integrates service level management and service operation management into proactive service level agreement management using dynamic dispatching priority adjustment, using a severity level associated with a respective service request class, wherein the priority is assigned by a provider and reflects a servicing order of the service request, and the severity level is assigned by a user, and wherein the performance management controller of the computer is initialized with first data received from the provider and the user and stored in a first data structure;

converting a multiple-input multiple-output (MIMO) control problem for all service request classes into multiple single-input single-output (SISO) control problems by the feedback control system, using a control objective of equal safety margin across all service level agreement classes, wherein multiple feedback controllers operate in a distributed manner with each service functional unit having its own set of controllers, and wherein global service level agreement targets are used as local targets, such that meeting the local targets leads to meeting the global service level agreement targets;

incorporating additional data from a closed loop feedback mechanism, of the performance management controller of the computer, to continuously update the first data stored in the first data structure as the additional data becomes available, wherein the performance management controller of the computer is responsive to changes in the workload including changes in volumes of customer service requests, changes in distribution across severity levels, and changes in a required service time for different service requests, and wherein workload change detection and handling is included in the closed loop feedback mechanism;

extracting service request information about a respective service request directly from an external ticketing system integrated with the feedback control system, by a real-time adapter, wherein the service request information includes information comprising a request open date and a request open time for the respective service request, a request close date and a request close time for the respective service request, a customer, and the severity level for the respective service request;

calculating, in each control iteration of the performance management controller of the computer, a control error associated with each service request class in the plurality of service request classes, by the performance management controller of the computer, using one of a set of predetermined algorithms, wherein the control error, for a given time, is calculated as a weighted difference between a service attainment target associated with a particular service level agreement and a service attainment measurement for the particular service level agreement, measured at the given time, minus a calculated average safety margin across multiple service classes measured at the given time;

identifying, by the performance management controller of the computer, a service request class having a largest control error from a plurality of service request classes associated with a set of service level agreements, wherein the service request class closest to a respective target of the service request class has the largest control error;

responsive to identifying the service request class having the largest control error from the plurality of service request classes, identifying, by the performance management controller of the computer, whether the priority of the service request class having the largest control error has been previously increased, wherein an increase in the priority for each service request class is set to a predetermined limit;

responsive to identifying that the priority of the service request class having the largest control error has not been previously increased, monotonically increasing, by the performance management controller of the computer, the priority of the service request class having the largest control error to form an updated priority using one of the set of predetermined algorithms, wherein the performance management controller of the computer reprioritizes priorities for the service request classes on a per control interval basis and updates the first data structure using continual data updates comprising the additional data from the closed loop feedback mechanism, and wherein a predetermined number of samples are collected for a statistically meaningful reprioritization determination;

responsive to identifying the priority of the service request class having the largest control error has been previously increased, refraining, by the performance management controller of the computer, from increasing the priority of the service request class having the largest control error to form the updated priority;

determining, by the performance management controller of the computer, whether the priority for each of the plurality of service request classes has been previously increased;

responsive to determining that the priority for each of the plurality of service request classes has been previously increased, resetting, by the performance management controller of the computer, the priority for each of the plurality of service request classes to a respective original priority and to update the first data structure using the continual data updates comprising the additional data from the closed loop feedback mechanism; and dispatching, by a dispatcher within a service delivery process of the computer, service requests for the plurality of service request classes in a next control iteration according to reprioritized priorities determined by the performance management controller of the computer in response to dynamic performance relative to service level agreement attainment targets from changes in workload using the continual data updates from the closed loop feedback mechanism.

2. The computer implemented method of claim 1, wherein the identifying the service request class having the largest control error and increasing the priority of the service request class having the largest control error are performed by the performance management controller of the computer on a per predetermined control interval basis.

3. The computer implemented method of claim 1, wherein the service request class having the largest control error is the service request class having a largest deviation from an average safety margin for the plurality of service request classes for the given time.

4. The computer implemented method of claim 3, wherein the average safety margin for the given time is determined by the performance management controller of the computer using one of a plurality of weighted control objectives for each of the plurality of service request classes for the given time, wherein each of the weighted control objectives are based on a penalty cost for a service level agreement violation of an associated one of the plurality of service request classes.

5. The computer implemented method of claim 1, further comprising:

delivering, by the computer, information technology services according to the set of service level agreements.

6. A computer program product for programmatic adjustment of a priority of a service request in a workload, the computer program product comprising:

a non-transitory computer readable storage medium having program instructions stored thereon for execution by a computer, the program instructions comprising;

program instructions for a performance management controller of the computer in a feedback control system using closed loop performance management that integrates service level management and service operation management into proactive service level agreement management using dynamic dispatching priority adjustment, to initialize a priority of each service request class in a plurality of service request classes using a severity level associated with a respective service request class, wherein the priority is assigned by a provider, reflecting a servicing order of the service request, and the severity level is assigned by a user, and wherein the performance management controller of the computer is initialized with first data received from the provider and the user and stored in a first data structure;

program instructions for converting a multiple-input multiple-output (MIMO) control problem for all service request classes into multiple single-input single-output (SISO) control problems by the feedback control system, using a control objective of equal safety margin across all service level agreement classes, wherein multiple feedback controllers operate in a distributed manner with each service functional unit having its own set of controllers, and wherein global service level agreement targets are used as local targets, such that meeting the local targets leads to meeting the global service level agreement targets;

program instructions for the performance management controller of the computer to incorporate additional data from a closed loop feedback mechanism, of the performance management controller of the computer, to continuously update the first data stored in the first data structure as the additional data becomes available, wherein the program instructions for the performance management controller of the computer are responsive to changes in the workload including changes in volumes of customer service requests, changes in distribution across severity levels, and changes in a required service time for different service requests, and wherein workload change detection and handling is included in the closed loop feedback mechanism;

program instructions for the performance management controller of the computer to extract service request information about a respective service request directly from an external ticketing system integrated with the feedback control system, by a real-time adapter, wherein the service request information includes information comprising a request open date and a request open time for the respective service request, a request close date and a request close time for the respective service request, a customer, and the severity level for the respective service request;

program instructions for the performance management controller to calculate, in each control iteration of the performance management controller of the computer, a control error associated with each service request class in the plurality of service request classes, using one of a set of predetermined algorithms, wherein the control error, for a given time, is calculated as a weighted difference between a service attainment target associated with a particular service level agreement and a service attainment measurement for the particular service level agreement, measured at the given time, minus a calculated average safety margin across multiple service classes measured at the given time;

program instructions for the performance management controller of the computer to identify a service request class having a largest control error from a plurality of service request classes associated with a set of service level agreements, wherein the service request class closest to a respective target of the service request class has the largest control error;

program instructions, responsive to identifying the service request class having the largest control error from the plurality of service request classes, for the performance management controller of the computer to identify whether the priority of the service request class having the largest control error has been previously increased, wherein an increase in the priority for each service request class is set to a predetermined limit;

program instructions, responsive to identifying the priority of the service request class having the largest control error has not been previously increased, for the performance management controller of the computer to monotonically increase the priority of the service request class having the largest control error to form an updated priority using one of the set of predetermined algorithms, wherein the performance management controller of the computer continuously reprioritizes priorities for the service request classes on a per control interval basis and updates the first data structure using continual data updates comprising the additional data from the closed loop feedback mechanism and wherein a predetermined number of samples are collected for a statistically meaningful reprioritization determination;

program instructions, responsive to identifying the priority of the service request class having the largest control error has been previously increased, for the performance management controller of the computer to refrain from increasing the priority of the service request class having the largest control error to form the updated priority;

program instructions, for the performance management controller of the computer to determine whether the priority for each of the plurality of service request classes has been previously increased;

program instructions, responsive to determining the priority for each of the plurality of service request classes has been previously increased, for the performance management controller of the computer to reset the priority for each of the plurality of service request classes to a respective original priority and to update the first data structure using the continual data updates comprising the additional data from the closed loop feedback mechanism; and program instructions to dispatch service requests for the plurality of service request classes in a next control iteration according to reprioritized priorities determined by the performance management controller of the computer in response to changes in workload using the continual data updates from the closed loop feedback mechanism.

7. The computer program product of claim 6, wherein the program instructions for the performance management controller of the computer to identify the service request class having the largest control error and increasing the priority of the service request class having the largest control error are performed on a per predetermined control interval basis.

8. The computer program product of claim 6, wherein the service request class having the largest control error is the service request class having a largest deviation from an average safety margin for the plurality of service request classes for the given time.

9. The computer program product of claim 8, wherein the average safety margin for the given time is determined using program instructions, for the performance management controller of the computer using one of a plurality of weighted control objectives for each of the plurality of service request classes for the given time, and wherein each of the weighted control objectives are based on a penalty cost for a service level agreement violation of an associated one of the plurality of service request classes.

* * * * *